US008588961B2

(12) United States Patent
Goltz

(10) Patent No.: US 8,588,961 B2
(45) Date of Patent: Nov. 19, 2013

(54) METHOD FOR CONTROLLING THE TRANSPORT OF SAFE BAGS

(75) Inventor: Marco Goltz, Berlin (DE)

(73) Assignee: Wincor Nixdorf International GmbH (DE)

( * ) Notice: Subject to any disclaimer, the term of this patent is extended or adjusted under 35 U.S.C. 154(b) by 19 days.

(21) Appl. No.: 13/355,985

(22) Filed: Jan. 23, 2012

(65) Prior Publication Data

US 2012/0191239 A1 Jul. 26, 2012

(30) Foreign Application Priority Data

Jan. 24, 2011 (DE) ......................... 10 2011 000 294

(51) Int. Cl.
*G06F 7/00* (2006.01)

(52) U.S. Cl.
USPC ........... 700/221; 700/228; 700/115; 700/213; 700/220; 700/223; 700/231

(58) Field of Classification Search
None
See application file for complete search history.

(56) References Cited

U.S. PATENT DOCUMENTS

2012/0145777 A1 * 6/2012 Brindley et al. .............. 235/375

FOREIGN PATENT DOCUMENTS

| | | | |
|---|---|---|---|
| DE | 102009015047 | A1 | 9/2010 |
| WO | 2008/031115 | A1 | 3/2008 |
| WO | 2008/125722 | A1 | 10/2008 |

* cited by examiner

*Primary Examiner* — Yolanda Jones
(74) *Attorney, Agent, or Firm* — Harness, Dickey & Pierce, P.L.C.

(57) ABSTRACT

A method for controlling the transport of transport bags (20, 22) filled with notes of value, in which in a database of a central control unit (11) data with information of several orders for the transport of transport bags (20, 22) are stored. After a transport case (16) has been removed from the rack (14) of a vehicle (12), data with information about the removed transport case (16) are transmitted to the central control unit (11) which then assigns the transport case (16) to a selected order. After the transport bags (20, 22) were taken from the device (18) for handling notes of value and were inserted into the transport case (16), the device (18) transmits data with information about the inserted transport bags (20, 22) to the central control unit (11) which then assigns the inserted transport bag (20, 22) to the transport case (16) and/or the order.

15 Claims, 2 Drawing Sheets

METHOD FOR CONTROLLING THE TRANSPORT OF SAFE BAGS

CROSS REFERENCE TO RELATED APPLICATIONS

This application claims the benefit and priority of German Patent Application No. 102011000294.4 filed Jan. 24, 2011. The entire disclosure of the above application is incorporated herein by reference.

FIELD OF THE INVENTION

The invention relates to a method for controlling the transport of transport bags filled with notes of value, in which data with information of several orders for the transport of transport bags from devices for handling notes of value to a cash center are stored in a database of a central control unit. For this, the transport bags taken from the device are placed in a transport case.

BACKGROUND OF THE INVENTION

The devices for handling notes of value are in particular automated teller machines, automatic cash safes or automatic cash systems. For the removal of notes of value contained in such devices, these notes of value can be placed into transport bags, so-called safe bags. A device for the automatic destacking of notes of value into a transport bag is known from the document DE 10 2009 015 047 A1. The transport bags with the notes of value contained therein are transported to a cash center by means of a valuable transport company. For protection of the transport bags and for a common handling of several transport bags, these transport bags are placed in transport cases.

In known methods, for this, in order to execute such a pick-up order, a barcode that is applied to the transport case in which the transport bags are to be placed is at first scanned by an employee of the valuable transport company in charge so that it is known which transport case is used for this order. Subsequently, each of the transport bags taken from the device to be emptied is likewise manually scanned by the employee of the valuable transport company before it is inserted into the transport case. What is problematic with this method is that a large number of manual scanning operations are required. This involves considerable effort and time. Further, such manual detection steps are error-prone, and it cannot be guaranteed that the scanned transport bags are actually inserted into the scanned transport case.

SUMMARY OF THE INVENTION

It is an object of the invention to specify a method for controlling the transport of transport bags filled with notes of value, by means of which an easy, automatic monitoring and tracking of the transport of transport bags is possible.

According to an aspect of the invention, the transport case to be used for the transport of the transport bags is taken from a rack of a valuable transport vehicle, data with information about the removed transport case being transmitted to a central control unit via a first data transmission connection. The central control unit then assigns a selected order from the database to the transport case and stores corresponding data. Further, a transport bag is taken from the device for handling notes of value and is inserted into the transport case. The device for handling notes of value then transmits data with information about the inserted transport bag via a second data transmission connection to the central control unit which then assigns the inserted transport bag to the transport case and/or the order and stores corresponding data.

In this way, it is achieved that the transport case used for execution of the order and the transport bags inserted therein do not have to be manually scanned but the assignment of the transport bags, the transport cases and the selected order relative to one another can take place automatically. Thus, the effort is reduced and the susceptibility to errors is minimized. Further, it is possible to automatically monitor and track transport bags during the entire transport to the cash center in an easy manner because at every point in time knowledge about the contained transport bags and transport cases is available. By placing the transport bags in the transport case, it is achieved that, on the one hand, the transport bags are better protected and, on the other hand, several transport bags can be contained jointly in one transport case so that only one transport case instead of a large number of transport bags has to be handled.

The control unit is in particular a computer which is preferably arranged in a control center charged with the control and the monitoring of a money circuit. Preferably, this computer provides a database for administration of the data relevant for the invention or is connected to a database suitable for the administration of these data and information.

In the database, for each order preferably one identification number of the device for handling notes of value to which the order refers is stored and is unambiguously assigned to the order. Alternatively, instead of an identification number also other information for an unambiguous identification of the device can be stored.

The first data transmission connection is in particular established between the rack or the valuable transport vehicle and the central control unit. For this, the rack or, respectively, the valuable transport company in particular comprises a sending and/or receiving unit for sending mobile radio data or, respectively, for receiving mobile radio data, with the aid of which mobile radio data with the corresponding information can be transmitted to the central control unit. By this wireless transmission it is achieved that the data can be transmitted in a secure manner independent of the position of the valuable transport vehicle. In addition, the sent data can comprise information for the unambiguous identification of the valuable transport vehicle, in particular an identification number of the valuable transport vehicle and/or position information about the current position of the valuable transport vehicle.

The data transmission connection between the device for handling notes of value and the central control unit is in particular likewise fashioned in the form of a wireless data transmission connection, preferably likewise via a mobile radio connection. In alternative embodiments of the invention this data transmission connection can also be cable-based, in particular via a secure data transmission connection via a wide area network such as the Internet.

In particular, the second data transmission connection is the data transmission connection via which also control data and/or stock data of the device for handling notes of value are transmitted to the central control unit for stock monitoring. Thus, no separate data transmission connection has to be established but existing data transmission connections can be used so that no additional components are required.

The device for handling notes of value is in particular an automated teller machine, an automatic cash safe, an automatic cash system and/or a consolidator. The notes of value are in particular banknotes which were deposited into the device by users of the device and are to be removed from the device for emptying the device. Devices with the aid of which cash cassettes used in automatic cash systems can be centrally emptied and filled are in particular referred to as consolidators.

In a preferred embodiment, the transport case is closed and inserted into the rack of the valuable transport vehicle after the transport bags have been inserted into the transport case. Thereafter, data with information about the presence of the transport case in the rack are transmitted to the central control unit via the first data transmission connection so that it can be centrally monitored in the central control unit at which location which transport case and via the assignment of the transport bags to the transport cases thus also which transport bags are located.

The valuable transport vehicle transports the transport case contained in the rack in particular to a cash center where it is taken from the rack. Subsequently, the transport case is inserted in a so-called docking station, and a cover of the transport case is opened so that the transport bags can be taken from the transport case. Here, information applied to the transport bag is detected and transmitted to the central control unit. The central control unit then compares these data to those data that were transmitted from the device for handling notes of value to the control unit via the second data transmission connection. Dependent on the result of this comparison, the control unit detects whether there is a manipulation attempt or not. Here, both the information transmitted via the second data transmission connection from the device for handling notes of value to the central control unit and the information applied to the transport bags, each comprise in particular an identification number for the unambiguous identification of the transport bags. The control unit compares these identification numbers to each other and in particular detects a manipulation attempt when the two identification numbers do not match each other. In this way, it can easily be determined in the cash center whether a transport bag has been stolen and/or whether a transport bag has been mixed up. Thus, it is not necessary to monitor the individual transport bags during their transport to the cash center but it is only necessary to match the stock of transport cases against the target stock in the cash center. Thus, the number of required detections of the transport bags for monitoring is reduced so that an easy secure transport of the transport bags from the device for handling notes of value to the cash center is achieved.

The information applied to the transport bag is in particular printed or stuck on the transport bag in the form of a barcode. Here, this can be a one-dimensional barcode or a two-dimensional barcode. The barcode is in particular printed on the transport bag by the device for handling notes of value which deposits the notes of value in the transport bag and closes the transport bag. In alternative embodiments of the invention, also an RFID chip in which the information is stored can be provided on the transport bag. This storage is likewise an inventive application of the information on the transport bag.

When the presence of a manipulation attempt is detected by means of the central control unit, then the central control unit preferably triggers a cancellation unit of the manipulated or, respectively, missing transport bag, which irreversibly cancels the notes of value contained in this transport bag. This cancellation unit is preferably a so-called ink kit by which, when triggered, the notes of value contained in the transport bag are irreversibly inked with a dye. Thus, the cancelled notes of value can no longer be brought into circulation and have no value for a potential thief.

The data transmitted to the central control unit upon removal of the transport case from the rack prior to the transport of the transport case to the device for handling notes of value preferably comprise information for the unambiguous identification of the transport case so that this transport case can be unambiguously assigned to the order. In particular, the data comprise an unambiguous identification number by means of which the transport case can be unambiguously identified.

The data transmitted from the device for handling notes of value to the central control unit in particular comprise an identification number for the unambiguous identification of the removed transport bag, information about the number of notes of value contained in the removed transport bag and/or information about the denomination of the notes of value contained in the removed transport bag.

After removal of the transport bags from the transport case in the cash center, the notes of value contained in the transport bags are in particular counted and the stock determined in this way is compared by the central control unit to the target stock that has been transmitted from the device for handling notes of value via the second data transmission connection to the central control unit. In this way, it cannot only be detected in an easy manner when a transport bag is missing but also a manipulation of the content of the transport bag and a potential manipulation attempt can be detected.

In a preferred embodiment of the invention, a partial quantity of the orders stored in the database and/or all orders stored in the database are displayed to an employee of the valuable transport company in charge of the execution of the orders stored in the database. Prior to the removal of the transport case from the rack, the employee selects the order to be executed next by him. This is displayed in particular via a display unit of the valuable transport vehicle or via a portable terminal of the employee. Via a data transmission connection, data with information about this selection are transmitted to the central control unit so that the control unit, after removal of the transport case from the rack and the transmission of the data with information about the transport case, can assign the transport case to the selected order.

In a particularly preferred embodiment, the data with the information about the selection and the data with information about the removed transport case are jointly transmitted to the central control unit so that only one data transmission is required. In this way, it is achieved that the valuable transport company can individually optimize the execution of the orders given to it and can arrange optimal tours, and the automatic monitoring and the automatic detection of the transport bags and the assignment of the transport bags, the transport cases and the orders to one another can nevertheless take place centrally.

In an alternative embodiment of the invention, the sequence of the execution of the orders can be fixedly preset so that it is not necessary for the employee to select the order which the employee has to execute as next order. The central control unit in this case indicates the order to be executed next according to the preset sequence and assigns the transport case removed as next transport case to this order.

In a further alternative embodiment, the device sends data with information for the unambiguous identification of the device to the central control unit, whereupon, dependent on these data, it selects the order associated to the device and stored in the database and assigns this order to the transport case removed last from the rack. In this way, it is automatically determined which order is just executed by the employee so that the employee does not have to manually input the order just executed by him. Thus, the number of manual inputs is reduced further and the automation is optimized. The information for identification of the device in particular comprises an unambiguous identification number of the device. In the database of the central control unit the identification number of the device for handling notes of value to which the order refers is assigned to each order so that the central control unit can determine the order that is just executed by means of a comparison of the identification number transmitted thereto by the device with the stored identification numbers.

Preferably, the opening of a safe door of the device is detected with the aid of a sensor and then the data with the information for identification of the device are transmitted to the central control unit. Alternatively, the data can also only be transmitted when the employee of the valuable transport company, for example by means of a chip card, logs on at the device and/or has authorized himself. Further, it is alternatively possible that the data with the information for identification and the data with the information about the transport bags are jointly transmitted when the device has closed the transport bags.

The transport case is in particular closed such that it can only be opened again in a non-destructive manner in the cash center. This can, for example, take place in that a locking mechanism is provided which can only be unlocked when the transport case is inserted in a specific docking station in the cash center and is connected to the docking station via a plug connection. Further, this closing can take place such that a locking mechanism is used which can only be opened with a specific key that is only available in the cash center.

Additionally or alternatively, it is possible that a cancellation unit of the transport case for the irreversible cancellation of the notes of value contained in the transport bags placed in the transport case is switched into an activated operating state upon insertion of the transport case into the rack and remains in this activated operating state up to the removal of the transport case in the cash center. In the activated operating state, the cancellation unit cancels the notes of value at least upon opening the cover of the transport case and/or upon detection of a manipulation attempt by a sensor arranged in the transport case, such as a position, vibration, gas or liquid sensor. The cancellation unit is preferably fashioned in the form of an ink kit. The ink kit in particular comprises a pyrotechnical unit which melts the transport bag open so that the notes of value can be inked. Alternatively, the wall of the transport bag can also be pierced through and the dye can be injected into the transport bag.

Further, it is advantageous when the central control unit detects a manipulation attempt when a transport bag which, in accordance with the data transmitted from the device for handling notes of value to the central control unit, is supposed to be arranged in the transport case is actually detected outside the transport case. For example, the transport bag can be detected by another device for handling notes of value and/or other detection devices, for example in the cash center. In this case, there must be a manipulation attempt since the transport bag, if detected outside the transport case, cannot be contained in the transport case as planned.

In an alternative embodiment, the transport case can also be designed such that transport bags can indeed be supplied thereto but transport bags that were supplied thereto cannot be removed again outside the cash center. In this way, it is guaranteed that transport bags that have once been placed therein cannot be removed again during the transport to the cash center.

In a particularly preferred embodiment of the invention several transport bags are taken from the device for handling notes of value and are inserted into the transport case. Thus, in particular all notes of value to be taken from the device can be taken via the transport bags in one operation and can be stored in one transport case so that for the further transport only this one transport case has to be handled. The device for handling notes of value transmits data with information about all transport bags inserted into the transport case via the second data transmission connection to the central control unit, which then accordingly assigns all inserted transport bags to the transport case and/or the order and stores corresponding data. After the transport case has been transported to the cash center, the transport bags are removed and identified in particular via their respective identification number. The central control unit compares the determined identification numbers with those identification numbers that were transmitted via the second data transmission connection from the device and detects a manipulation attempt when not all transport bags which should be contained in the transport case according to the data transmitted from the device are actually contained in the transport case. The detection of the identification number in the cash center in particular takes place automatically in that a barcode applied to the transport bag is read and/or data are read out from an RFID chip of the transport bag. The barcode or the read-out data preferably include the identification number. Alternatively, by means of the barcode or the read-out data the identification number can be read out from a database.

In an alternative embodiment of the invention, also at least two transport cases can be taken from the rack for execution of an order, wherein, into these transport cases, each time at least one transport bag taken from the device for handling notes of value is inserted. The device then transmits data with information about the inserted transport bags to the central control unit which assigns the transport bags to the transport cases and/or the corresponding order. Here, no assignment of a transport bag to exactly one transport case is made but to the unit of transport cases which are used for the order. After the transport of the transport cases to the cash center, the transport bags are again removed and identified. Subsequently, it is compared whether all transport bags that were inserted into the used transport cases are actually present in the transport cases. Here, too, the transport cases are again taken as one unit so that it is compared whether in all transport cases used for this order all transport bags inserted into these transport cases are contained. There is no detection and comparison as to which transport bag was included in which transport case. In this way, also a large number of transport bags can be handled easily by means of several transport cases, without it having to be manually determined in which transport case which transport bag is contained. Thus, here, too, a fully-automatic detection and monitoring of the transport of the transport bags is possible.

After closing a transport bag, the device for handling notes of value in particular applies a seal with an unambiguous seal number to the transport bag, wherein this seal number is read out for each transport bag contained in the transport case after removal of the transport bags from the transport case in the cash center. Thereafter, a comparison of the seal number detected in the cash center to the seal number applied by the device for handling notes of value and transmitted to the central control unit via the second data transmission connection takes place. When the seal numbers do not match each other, a manipulation attempt is detected.

Further, when supplied to the cash center, the transport cases can be detected via RFID chips arranged in the transport cases when these are transported through so-called gates by means of which data stored in the RFID chips can be read out so that the arrival of a transport case in the cash center can automatically be determined.

The transport cases are in particular fashioned such that they can only be inserted into the rack and/or data can only be transmitted from the rack to the central control unit when a cover of the transport case is closed. In this way, it is guaranteed that the transport case is actually closed prior to the insertion into the rack.

Further, the device for handling notes of value determines in particular whether all transport bags filled and closed by it have been removed, or whether only a partial amount has been removed. Further, the device transmits data with information thereon to the central control unit so that it can monitor the transport of the transport bags.

The transport cases can be fashioned such that they comprise only one receiving compartment, in which several transport bags can be placed. Alternatively, transport cases can also comprise several receiving areas, wherein one or several transport bags can be placed in every receiving area.

BRIEF DESCRIPTION OF THE DRAWINGS

Further features and advantages of the invention result from the following description which explains the invention in more detail with reference to embodiments in connection with the enclosed Figures, in which.

DETAILED DESCRIPTION OF THE PREFERRED EMBODIMENTS

Figure 1:
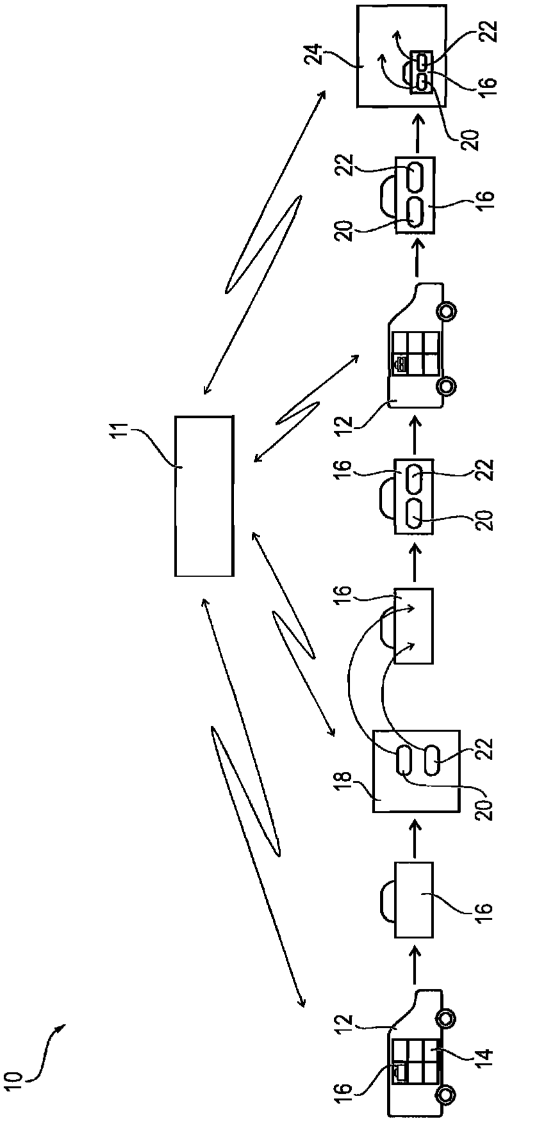
FIG. 1 shows a schematic illustration of components involved in a sequence for emptying a device for handling notes of value and for the transport of the removed notes of value to a cash center.
Figure 2:
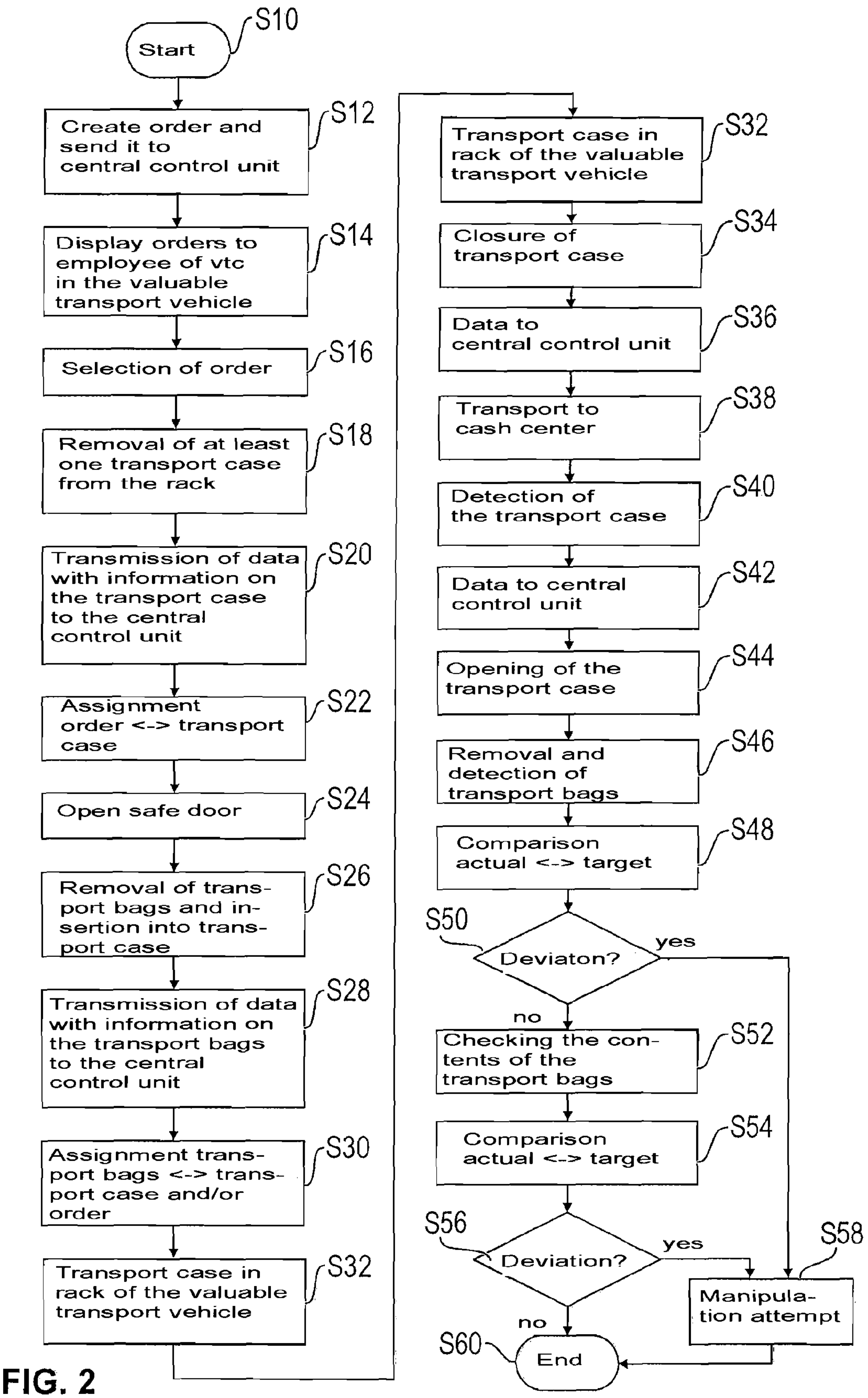
FIG. 2 shows a flow diagram of the sequence according to FIG. 1.

In FIG. 1, a schematic illustration of components involved in a sequence 10 for execution of an order for the removal of notes of value from a device 18 for handling notes of value and for the transport of these notes of value to a cash center 24 is illustrated. In FIG. 2, a flow diagram of this sequence is shown.

After the method was started in step S10, orders for emptying devices 18 for handling notes of value are created in step S12 and stored in a database of a central control unit 11. For each order, an identification number of the device for handling notes of value to which the order refers is stored in the database and unambiguously assigned to the order. The devices for handling notes of value are in particular automated teller machines, automatic cash systems, automatic cash safes and/or consolidators. In these devices 18, the notes of value are manually input by the user and/or via cash cassettes. These input notes of value have to be removed from the device 18 before or when a maximum storage capacity of the device 18 is reached. For this, in particular a valuable transport company is instructed, which executes these orders and removes the notes of value from the device 18 and transports them to a cash center 24 in which the notes of value are further processed.

On the basis of the orders stored in the database, the valuable transport company creates a tour for a valuable transport vehicle 12, in which tour it is specified which orders have to be executed by the driver of the valuable transport vehicle 12. Via a display of the valuable transport vehicle or a mobile terminal, it is displayed to the employee of the valuable transport company in step S14 which orders are to be executed by him. Such a terminal can, for example, be a mobile phone with corresponding application software, preferably a smart phone. In step S16, the employee selects the order which he intends to execute next. Thereafter, data with information about this selected order are transmitted via a mobile radio connection to the central control unit 11.

After the valuable transport vehicle 12 has arrived at the location of the device 18, the employee takes a transport case 16 from a rack 14 arranged in the valuable transport vehicle 12 in step S18. The transport case 16 is, as long as it is arranged in the rack 14, connected to the rack via a plug connection. When the transport case 16 is removed from the rack 14 and thus the plug connection is disconnected, then the valuable transport vehicle 12 transmits data with information about the removed transport case 16 via a mobile radio connection to the central control unit 11. In particular, these data are transmitted together with the data with information about the selected order to the central control unit 11. These data transmitted in step S20 in particular comprise information for the unambiguous identification of the transport case 16, preferably an unambiguous identification number. Subsequently, the central control unit 11 assigns the transport case 16 to the selected order in step S22 and stores corresponding data.

In step S24, the employee of the valuable transport company opens a safe door of the device 18 and in step S26 of the illustrated embodiment he takes two transport bags 20, 22 from the device 18, in which bags the notes of value to be removed and to be transported to the cash center 24 are contained. The device 18 has previously closed the transport bags 20, 22 and has printed a one- or two-dimensional barcode with information about the transport bags 20, 22, in particular a respective unambiguous identification number for identification of the respective transport bag 20, 22 onto the respective transport bag 20, 22.

Alternatively, the information about the respective transport bag 20, 22 can have already been applied to the bag prior to the insertion of the transport bags 20, 22 into the device 18. Preferably, the information is detected prior or during the insertion into the device 18 by a sensor unit of the device 18. Alternatively or additionally, the information can be stored in an RFID storage of the transport bag 20, 22 and can be read out by a reading unit of the device 18 or can be written into the RFID storage by the device 18.

In step S28, the device 18 transmits via a mobile radio connection or a cable-based data transmission connection data with information about the transport bags 20, 22 taken therefrom to the central control unit 11. These data comprise in particular the respective identification number of the transport bag 20, 22 and/or the stock of notes of value which are contained in the respective transport bag 20, 22. Further, these data comprise in particular information for the unambiguous identification of the device 18, for example the identification number of the device 18.

Dependent on these data transmitted to the central control unit 11, the central control unit 11 assigns in step S30 the transport bags 20, 22 to the transport case 16 and/or the selected order and again stores corresponding data. In this way, it is achieved that, without a manual detection of the transport case 16 and of the transport bags 20, 22, an automatic secure assignment of the transport bags 20, 22 to the transport case 16 takes place and thus the transport of the transport bags 20, 22 can easily be monitored.

Subsequently, the transport case 16 is again inserted into the rack 14 of the transport vehicle 12 in step S32 and a plug connection is established between the transport case 16 and the rack 14. Here, the transport case 16 is electronically "sealed" in step S34 so that it can only be opened again by an authorized person in the cash center 24. For this, in particular an ink kit for irreversibly inking the notes of value contained in the transport case 16 with a dye can be switched into an activated operating state, in which the ink kit, in the case of a manipulation attempt, in particular when opening a cover of the transport case 16, is triggered. Further, via a mobile radio connection data with information on the fact that the transport case 16 is now again arranged in the transport vehicle 12 are transmitted in step S36 to the central control unit 11 so that it can track the position of the transport case 16.

After the transport case 16 was transported with the aid of the valuable transport vehicle 12 in step S38 to the cash center and was removed from the valuable transport vehicle 12, it is automatically detected in step S40 in the cash center 24. The transport case 16 comprises in particular an RFID chip in which data for the unambiguous identification of the transport case 16 are stored. Upon transport of the transport case 16 into the cash center 24, it must in particular be transported along a detection unit for reading out RFID chips, which unit automatically reads out the RFID chip of the transport case 16 and thus determines the presence of the transport case 16 in the cash center 24. This detection unit is also referred to as gate.

These data of the transport case 16 detected with the aid of the detection unit, in particular the presence of the transport case 16 in the cash center 24, are transmitted in step S42 via a cable-based or wire-less data transmission connection from the detection unit to the central control unit 11 so that it is now stored in the central control unit 11 that the transport case 16 is arranged in the cash center 24. Thereafter, the transport case 16 is opened in step S44 by an authorized person in the cash center 24. The transport bags 20, 22 contained in the transport case 16 are taken from the transport case 16 in step S46 and the imprinted identification numbers or the identification numbers contained in the imprinted barcodes are automatically detected.

Subsequently, it is compared in step S48 whether exactly those transport bags 20, 22 which, in accordance with the data transmitted in step S28 from the device 18 to the central control unit 11, are to be contained in the transport case 16 are actually contained in the transport case 16. For this, the central control unit 11 in particular compares the identification numbers determined in step S46 to the identification numbers transmitted thereto in step S28. When it is determined in step S50 that there is a deviation, i.e. that not all transport bags 20, 22 which should be contained in the transport case 16 are actually arranged therein, then a manipulation attempt is detected in step S58. Thereupon, respective measures for punishing the manipulation attempt are triggered. In particular, an alarm is triggered so that an immediate reaction to a potential manipulation attempt is possible. Further, a cancellation unit can be triggered, with the aid of which a missing transport bag 20, 22 or, respectively, the notes of value contained therein can be cancelled. Subsequently, the method is terminated in step S60.

If, on the other hand, it is determined that there is no deviation, then the method is continued in step S52, in which the notes of value contained in the transport bags 20, 22 are counted.

Thereafter, in step S54 it is compared whether all notes of value which, according to the data transmitted in step S28, are to be contained in each of the transport bags 20, 22 are actually contained in the transport bags 20, 22. When it is determined in step S56 that all notes of value which are to be contained in the transport bags 20, 22 are actually contained therein, then the method is terminated in step S60. When, on the other hand, it is determined in step S56 that there is a deviation, i.e. that at least in one transport bag 20, 22 the determined actual stock does not match the target stock, then a manipulation attempt is detected in step S58. Thereupon, respective measures for punishing the manipulation attempt are triggered. Subsequently, the method is terminated in step S60.

In an alternative embodiment of the invention, the sequence in which the employee of the valuable transport company has to execute the orders, may also be preset in a fixed manner so that the selection in step S16 can be dispensed with and only the order that is to be executed next by the employee is displayed to the employee.

In a further alternative embodiment of the invention, the display of the orders and the selection of the orders in steps S14 and S16 can be dispensed with. In this embodiment, the device 18 transmits data with information for the unambiguous identification of the device 18 to the central control unit 11. The central control unit 11 then determines on the basis of the orders stored in its database which of these orders is assigned to the device 18 and assigns this selected order to the transport case 16 removed in step S18. Thus, the manual selection and the input of the order to be executed next can be dispensed with so that a complete automation of the assignment of the orders, of the transport cases 16 and of the transport bags 20, 22 to one another takes place. The transmission of the data with the information for identification of the device 18 in particular takes place together with the transmission of the data with the information about the transport bags 20, 22.

In a further alternative embodiment of the invention, also more or less than two transport bags 20, 22 can be taken from the device 18. Further, it is alternatively possible that also more than one transport case 16 is used for a removal of the transport bags 20, 22 from the device 18. In this case, these several transport cases 16 are taken as one unit which are assigned to the order together as one unit, wherein the transport bags 20, 22 are assigned to this unit formed by the transport cases 16. There is no individual assignment of the transport bags 20, 22 to the individual transport cases 16. Accordingly, in the cash center 24 it is only checked whether in all transport cases 16 used for this order all transport bags 20, 22 which have been taken from the device 18 are actually contained.

Alternatively, the transport bags 20, 22, when they are contained in the device 18, may each be connected to the device 18 via a locking mechanism. The device 18 unlocks the locking mechanisms of the transport bags 20, 22 in a step-wise manner in a preset sequence in which the transport bags 20, 22 are to be taken from the device 18. Via this locking, it is guaranteed that this sequence is actually maintained. For this, the device 18 preferably unlocks a further transport bag 20, 22 only when the previously unlocked transport bag 20, 22 has been removed. The device 18 transmits data with information about the removal sequence to the central control unit 11 so that the central control unit 11 can individually assign the transport bags 20, 22 to the used transport cases 16. Here, the transport cases 16 are not taken as a unit, but as respective individual cases.

What is claimed is:

1. A method for controlling the transport of transport bags filled with notes of value, comprising:

providing a central control unit with a database;

the database includes data stored therein with information of several orders for the transport of transport bags from devices for handling notes of value to a cash center;

wherein when one of these orders is selected, at least one transport case for receiving at least one transport bag is taken from a rack of a valuable transport vehicle;

providing a first data transmission connection;

wherein via the first data transmission connection data with information about the removed transport case are transmitted to the central control unit;

wherein the central control unit assigns the selected order to the transport case and stores corresponding data, and at least one transport bag is taken from the device for handling notes of value;

wherein according to the selected order, at least one transport bag is taken and is inserted into the transport case, and the device for handling notes of value transmits data with information about the inserted transport bag via a second data transmission connection to the central control unit; and wherein the central control unit assigns the inserted transport bag to the transport case and/or to the order and stores corresponding data.

2. The method according to claim 1, wherein, after insertion of the transport bag, the transport case is closed, wherein the transport case is inserted into the rack of the valuable transport vehicle, and wherein data with information about the presence of the transport case in the rack are transmitted via the first data transmission connection to the central control unit.

3. The method according to claim 2, wherein the transport case is taken from the rack in a cash center, wherein the transport case (16) is opened, wherein information applied to the transport bag contained in the transport case is detected, wherein data with this information are transmitted to the central control unit, wherein the central control unit compares these data with data transmitted thereto from the device for handling notes of value, and wherein the central control unit, dependent on this comparison, detects the presence of a manipulation attempt.

4. The method according to claim 3, wherein the data transmitted from the device for handling notes of value to the central control unit comprise an identification number of the removed transport bag, wherein the information detected in the cash center comprises an identification number of the transport bag, and wherein the central control unit detects the presence of a manipulation attempt when the two identification numbers are different from each other.

5. The method according to claim 3 or 4, wherein the information applied to the transport bag is stored in an RFID chip which is attached to the transport bag and/or comprises a barcode that is stuck or printed thereon.

6. The method according to one of the claims 3 to 5, wherein, when there is a manipulation attempt, a cancellation unit of the missing or, respectively, manipulated transport bag for the irreversible cancellation of the notes of value contained in this transport bag is triggered.

7. The method according to one of the preceding claims, wherein the first data transmission connection and/or the second data transmission connection is wireless, in particular, a mobile radio data connection.

8. The method according to one of the preceding claims, wherein the data transmitted upon removal of the transport case from the rack to the central control unit comprises information for the unambiguous identification of the transport case, in particular an identification number.

9. The method according to one of the preceding claims, wherein the data transmitted from the device to the central control unit comprises an identification number for the unambiguous identification of the removed transport bag, information about the number of the notes of value contained in the removed transport bag and/or information about the denomination of the notes of value contained in the removed transport bag.

10. The method according to one of the preceding claims, wherein at least one partial quantity of the orders stored in the database is displayed to an employee of the valuable transport company in charge of the execution of the orders, wherein the employee, prior to the removal of the transport case from the rack, selects the order to be executed next by him, and wherein data with information about this selection are transmitted to the central control unit.

11. The method according to one of the claims 1 to 9, wherein the device transmits data with information for the unambiguous identification of the device to the central control unit, and wherein the central control unit, dependent on these data, selects the order associated with the device and stored in the database and assigns this order to the transport case taken from the rack.

12. The method according to one of the claims 2 to 11, wherein the transport case is closed such that it can only be opened again in a non-destructive manner in the cash center and/or wherein a cancellation unit of the transport case for the irreversible cancellation of the notes of value contained in the transport bags placed in the transport case is switched into an activated operating state and remains in this activated operating state up to the removal of the transport case in the cash center (24), the cancellation unit being triggered in the activated operating state at least when a cover of the transport case is opened.

13. The method according to claim 12, wherein the central control unit detects the presence of a manipulation attempt when, while the transport case is in the activated operating state, a transport bag which, according to the data transmitted from the device for handling notes of value to the central control unit, is supposed to be arranged in the transport case is detected outside the transport case.

14. The method according to one of the preceding claims, wherein several transport bags are taken from the device for handling notes of value, wherein these transport bags are inserted into the transport case, wherein the device (18) for handling notes of value transmits data with information about all transport bags inserted into the transport case via the second data transmission connection to the central control unit, wherein the central control unit assigns the inserted transport bags to the transport case and/or the order and stores corresponding data, wherein the transport bags are taken from the transport case in the cash center and are identified, and wherein the central control unit detects the presence of a manipulation attempt when not all transport bags that are to be contained in the transport case according to the data transmitted from the device for handling notes of value to the central control unit are contained in the transport case, and/or when the stock of notes of value of at least one transport bag removed in the cash center deviates from the target stock of notes of value which is to be contained in this transport bag according to the data transmitted from the device for handling notes of value to the central control unit.

15. The method according to one of the preceding claims, wherein at least two transport cases are taken from the rack, wherein via the first data transmission connection data with information about the removed transport cases are transmitted to the central control unit, wherein the central control unit assigns the transport cases to the selected order and stores corresponding data, wherein several transport bags are taken from the device for handling notes of value and are inserted into the transport cases, wherein the device for handling notes of value transmits data with information about the inserted transport bags via the second data transmission connection to the central control unit, wherein the central control unit assigns the inserted transport bags to the transport cases and/or to the order, wherein the transport bags are taken from the transport cases in the cash center and are identified, and wherein the central control unit detects the presence of a manipulation attempt when not all transport bags that are to be contained in the transport cases according to the data transmitted from the device for handling notes of value to the central control unit are contained in the transport cases and/or when the stock of notes of value of at least one transport bag removed in the cash center deviates from the target stock of notes of value which is to be contained in this transport bag according to the data transmitted from the device for handling notes of value to the central control unit.

* * * * *